US007968493B2

(12) United States Patent
Sreekumaran Nair et al.

(10) Patent No.: US 7,968,493 B2
(45) Date of Patent: Jun. 28, 2011

(54) METHOD FOR THE PREPARATION OF ADSORPTION COMPOSITIONS INCLUDING GOLD OR SILVER NANOPARTICLES

(75) Inventors: Appukuttan Nair Sreekumaran Nair, Tamil Nadu (IN); Thalappil Pradeep, Tamil Nadu (IN)

(73) Assignees: Indian Institute of Technology, Chennai (IN); Aquamall Water Solutions Limited, Andhra Pradesh (IN)

( * ) Notice: Subject to any disclaimer, the term of this patent is extended or adjusted under 35 U.S.C. 154(b) by 543 days.

(21) Appl. No.: 10/586,603

(22) PCT Filed: Jan. 19, 2005

(86) PCT No.: PCT/IN2005/000022
§ 371 (c)(1),
(2), (4) Date: Jul. 20, 2006

(87) PCT Pub. No.: WO2005/070534
PCT Pub. Date: Aug. 4, 2005

(65) Prior Publication Data
US 2007/0166224 A1    Jul. 19, 2007

(30) Foreign Application Priority Data
Jan. 22, 2004   (IN) .............................. 51/CHE/2004

(51) Int. Cl.
*B01J 20/04*   (2006.01)
*B01J 20/06*   (2006.01)
*B01J 20/08*   (2006.01)
(52) U.S. Cl. .................... 502/400; 502/415; 502/417
(58) Field of Classification Search .................. 210/263, 210/502.1, 679, 691, 694; 502/400, 415, 502/417; 977/777, 779, 903
See application file for complete search history.

(56) References Cited

U.S. PATENT DOCUMENTS

| 4,216,084 | A | * | 8/1980 | Ikari et al. ..................... 210/670 |
| 4,234,456 | A | * | 11/1980 | Kamiya et al. ................ 502/405 |
| 5,256,300 | A | | 10/1993 | Cockett et al. |
| 5,322,628 | A | * | 6/1994 | Yan ............................... 210/673 |
| 5,360,547 | A | | 11/1994 | Cockett et al. |
| 6,315,816 | B1 | | 11/2001 | Cho et al. |
| 6,758,345 | B2 | * | 7/2004 | Heinig, Jr. .................... 210/501 |

(Continued)

FOREIGN PATENT DOCUMENTS

DE    222103 A    11/1973

(Continued)

OTHER PUBLICATIONS

Turkevich et al, the Formation of Colloidal Gold, Oct. 1953, Journal of Physical Chemistry, vol. 57, pp. 670-673.*

(Continued)

*Primary Examiner* — Matthew O Savage
(74) *Attorney, Agent, or Firm* — Pearl Cohen Zedek Latzer, LLP

(57) ABSTRACT

This invention relates to novel adsorbent compositions for adsorbing pesticides like chlorpyrifos and malathion. This composition consists of nanoparticles of gold/silver supported on activated alumina or magnesia in powder or other forms. This invention includes a device and a method for decontaminating water contaminated with pesticides. This device consists of a housing provided with an inlet and an outlet. The housing is loaded with nanoparticles of gold/silver supported on activated magnesia. Contaminated water is allowed to pass through the housing while pesticides are adsorbed by the composition. Decontaminated water flows out through the outlet.

6 Claims, 6 Drawing Sheets

U.S. PATENT DOCUMENTS

2002/0106513 A1    8/2002    Matyjaszewski et al.
2003/0097933 A1    5/2003    Choudary et al.
2003/0134741 A1    7/2003    Weisbeck et al.

FOREIGN PATENT DOCUMENTS

| | | |
|---|---|---|
| DE | 10032400 | 1/2002 |
| EP | 1839743 | 10/2007 |
| WO | WO 99/65826 | 12/1999 |
| WO | WO 02/083297 | 10/2002 |
| WO | WO 03/076341 | 9/2003 |
| WO | WO 2004/099114 | 11/2004 |

OTHER PUBLICATIONS

Office Action of Application No. 05703247.6-2104 dated Jan. 14, 2008.

International Search Report. International Publication No. PCT/IN2005/000022 Date of mailing Apr. 4, 2005.

\* cited by examiner

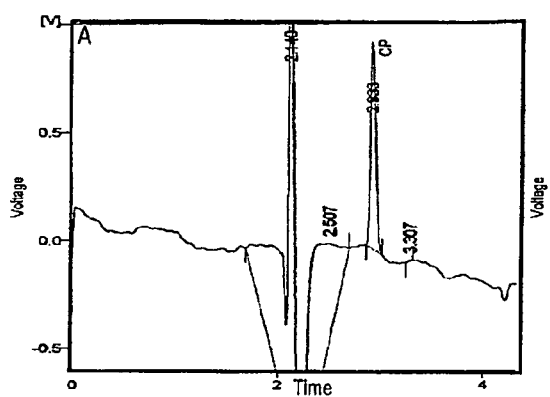 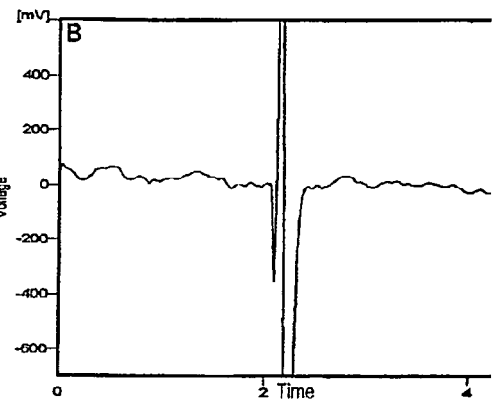
FIGURE 5                    FIGURE 6

METHOD FOR THE PREPARATION OF ADSORPTION COMPOSITIONS INCLUDING GOLD OR SILVER NANOPARTICLES

PRIOR APPLICATION DATA

The present application is a national phase application of International Application PCT/IN2005/000022, entitled "ADSORBENT COMPOSITION, A DEVICE AND A METHOD FOR DECONTAMINATING WATER CONTAINING PESTICIDES" filed on Jan. 19, 2005, which in turn claims priority from Indian application number 51/CHE/2004, filed on Jan. 22, 2004, all of which are incorporated by reference in their entirety.

FIELD OF THE INVENTION

Embodiments of the invention relate to technologies for removing pesticides from water for the production of safe drinking water.

BACKGROUND OF THE INVENTION

Majority of water bodies in the developed and developing countries are contaminated with organo-halogen and organo-sulphur pesticides as a result of their wide spread use in agriculture. Clean-up of such contaminated water bodies impose colossal financial burden on governmental and non-governmental organizations. Most developing countries do not have an effective system for removing pesticides from water. As a result pesticide-free drinking water is still a distant dream for most of the countries. A cheap and widely acceptable technology for removing pesticides from water for the production of safe drinking water has been a long-felt need in both the developed and developing countries.

Pesticide removal from drinking water is a vital issue that concerns many in both the developed and developing countries. Attempts have been made to degrade and remove a wide variety of halocarbon pollutants with bare metal nanoparticles of silver and gold. Metal halides and amorphous carbon are the products of such degradation. These bare metal nanoparticles are also found to be useful in detecting and extracting endosulfan, yet another widely used pesticide. Further, nanoscale iron particles and palladized iron nanoparticles are used to degrade a wide variety of halogenated organic pollutants. Nanoscale iron particles are also used in degrading two most common pesticides in water, namely DDT and lindane. $TiO_2$ nanoparticles have also been used to degrade harmful agrochemicals.

Activated carbon powder and carbon block have also been used to remove sediments and pesticides from water.

SUMMARY

Our invention relates to adsorbent compositions consisting of nanoparticles of silver and gold supported on activated alumina, magnesia and other suitable substrates, which are found effective in removing most common pesticides like chlorpyrifos and malathion chemically known as 0,0-Diethyl-O-(3,5,6-trichloro-2-pyridyl phosphonothioate and S-1,2- bis(ethoxycarbonyl)ethyl 0,0-dimethyl phosphorodithioate, respectively from flowing and static water. The method is also applicable for the removal of other chlorine and sulphur containing pesticides from water in addition to those mentioned above. This invention also relates to a device particularly attachable to on-line supply of drinking water and a method for decontaminating water containing pesticides.

This invention relates to adsorbent compositions containing silver or gold nanoparticles having sizes up to 150 nm, deposited on activated alumina and/or magnesia or a combination of these materials with activated carbon.

This invention also includes a device for decontaminating water contaminated with chlorpyrifos and malathion or other organo halogen/sulphur pesticides, which comprises a housing loaded with gold/silver nanoparticles supported on activated alumina and/or magnesia or a combination of these materials with activated carbon, the said housing provided with an inlet connectable to the water supply source, and an outlet for the decontaminated water, with the said outlet being provided with regulating means. This invention also relates to a method for decontaminating water comprising the steps of allowing contaminated water to flow through a bed of silver/gold nanoparticles supported on activated alumina and/or magnesia or a combination of these materials with activated carbon to adsorb pesticides like chlorpyrifos, malathion or other organo halogen/sulphur pesticides and collecting decontaminated water flowing out of the bed.

This invention also includes a process for preparing the novel adsorbent compositions having silver/gold nanoparticles deposited on activated alumina and/or magnesia or a combination of these materials with activated carbon. The said nanoparticles can be supported on any suitable substrate for the intended purpose.

Raw materials required for the present invention are $AgNO_3$, $HAuCl_4 \cdot 3H_2O$, trisodium citrate, activated alumina, activated magnesia, activated carbon and triply distilled water. Gold and silver nanoparticles are synthesized by known methods. In a preferred embodiment, 25 mL (1 mL in the case of gold) of 0.005 M silver nitrate ($HAuCl_4 \cdot 3H_2O$ in the case of gold) in water was diluted to 125 mL for Ag (19 mL for Au) and heated until it begins to boil. 5 mL of 1% sodium citrate solution (1 mL of 0.5% for Au) was added and heating continued till the colour of the solution turned to pale yellow for silver (wine red for Au). She silver and gold nanoparticles synthesized by the method have sizes up to 150 nm. The synthesized colloidal nanoparticles will be described as Ag@citrate or Au@citrate in the subsequent discussions. Bare nanoparticles of silver and gold synthesized in aqueous medium by alternative methods like sodium borohydride reduction can also be used.

The next step in the process involves incorporation of these nanoparticles on activated alumina or activated magnesia.

To one liter of the above Ag@citrate or Au@citrate, half a Kg of activated alumina or activated magnesia globules were soaked and kept with intermittent stirring for a minimum period of 6 hours to ensure saturable adsorption of nanoparticles. The saturable adsorption on nanoparticles' surface was ensured by measuring absorbance of the solution at periodic intervals. No decrease in absorbance of the solution was observed after the period thus indicting that saturable adsorption has taken place on the oxide surface. More nanoparticle solutions were added and stirring continued if saturation did not occur. Intake of nanoparticles per alumina globule is high, about 0.116 mg per globule on an average. After completion of deposition, the globules were washed with distilled water repeatedly and air-dried. In a modification of the procedure, nanoparticles may be loaded on to activated alumina powder (neutral) in which case the intake of nanoparticle is very high. 250 g of activated alumina powder can load the nanoparticles in 6 L of the above solutions. These compositions may be described as $Al_2O_3$ @ Au or $Al_2O_3$ @ Ag. In yet another modification of the procedure, the above nanoparticles (adsorbed on activated alumina) are baked with activated carbon at 120° C. Activated magnesia powder or magnesia globules can be used in place of alumina.

The device used by the inventors is a column. It consists of a housing having an inlet and an outlet. The inlet is connectable on-line to a water supply source. The housing is filled with either $Al_2O_3$ @ Au (powder or globule) or $Al_2O_3$ @ Ag (powder or globule) or combination of them with activated carbon adsorbent composition. There is a sealant provided at the base of the housing and a regulating means for regulating flow of water through the outlet.

In a preferred embodiment, 250 g of activated alumina powder saturated with nanoparticles was filled in the column. In a modification of the embodiment, activated alumina globules saturated with nanoparticles or a combination of with them with activated carbon was also used. 10 L of 50 ppb chlorpyrifos or malathion solution in water was made and used for the experiments. 1 L of the above water solution was taken as blank and chlorpyrifos in it was extracted thrice with 150 mL n-hexane. This was then concentrated to 2 mL in a rotavapour and made up to 10 mL in a standard flask using n-hexane. The amount of chlorpyrifos in it was quantitated using UV-visible spectroscopy and gas chromatography. The remaining pesticide containing water solution was passed continuously through the column containing the adsorbent composition and each 1 L of the outgoing solution was collected, and the pesticide content in it was extracted as above with n-hexane and analyzed by UV-visible spectroscopy and gas chromatography. Experiments were conducted with ppm level concentration of chlorpyrifos and malathion in water.

The same device was tested for over three months and with little or no reduction in the efficiency in pesticide removal.

BRIEF DESCRIPTION OF THE DRAWINGS

FIGS. 5 and 6 show graphical representations of gas chromatogram indicating the complete removal of chlorpyrifos from water using supported nanoparticles of silver.

DETAILED DESCRIPTION OF THE INVENTION

Figure 1:
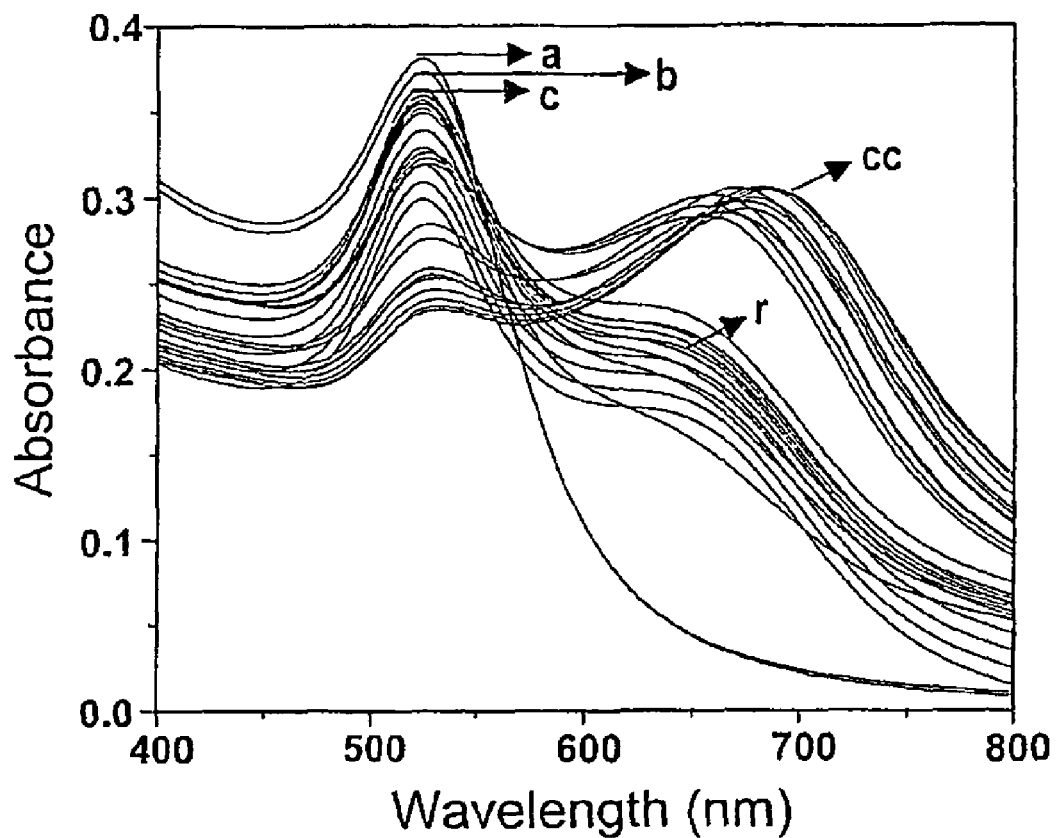
FIG. 1 shows graphical representation of pesticide adsorption on the nanoparticles' surface in solution state in a time dependent manner.

FIG. 1 refers to the time dependent UV-visible spectra showing the adsorption of chlorpyrifos on Au nanoparticles. Trace a is the absorption spectrum of 2 mL of Au@citrate (as prepared above, after diluting with equal volume of water) showing the absorption maximum at 522 nm. Trace b was taken 20 minutes after the mixing of 2 mL of 2 ppm chlorpyrifos (in water) with it. After 40 minutes, the plasmon excitation absorption at 522 nm decreases in intensity and another broad absorption feature emerges at longer wavelength (trace c). At this stage the solution turns pale blue in color. This can be attributed to the adsorption of chlorpyrifos on Au nanoparticles' surface and their subsequent aggregation. With further passage of time, the plasmon absorption at 522 nm decreases in intensity and that at longer wavelength gains in intensity accompanied by further red shift. This is due to the time dependent adsorption of chlorpyrifos on the nanoparticles' surfaces. Subsequent traces were recorded at 20 minutes intervals thereafter. After 4 hours (trace cc), the completely blue particles begin to precipitate due to aggregation.

Figure 2:
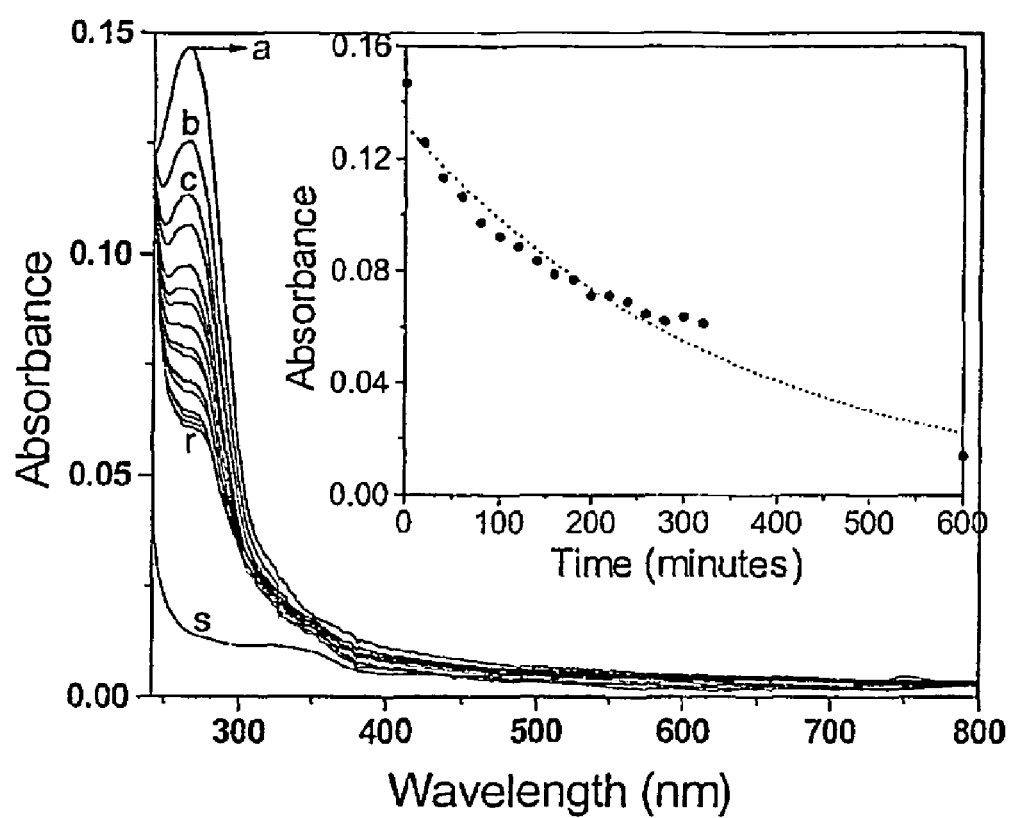
FIG. 2 shows graphical representation of removal of 1 ppm chlorpyrifos from water using silver nanoparticles supported on alumina.

FIG. 2 refers to the time dependent UV visible spectra showing the adsorption of 1 ppm chlorpyrifos on $Al_2O_3$ @ Ag. Trace a is the absorption spectrum of 1 ppm chlorpyrifos and b is the absorption spectrum of the solution, 20 minutes after soaking the supported nanoparticles in the pesticide solution. The subsequent traces (c-r) were taken at 20 minutes intervals thereafter. Small increase in background and a minor hump are also visible in the traces (c-r), possibly due to the formation of small quantities of $Ag^+$ in solution. Trace s was taken after 10 hours showing the complete disappearance of chlorpyrifos from water. The inset shows decrease in absorbance vs. time from the absorption spectroscopy data for the traces (a-s). The dotted line in the inset shows a fit of the exponential decrease in absorbance with time.

Figure 3:
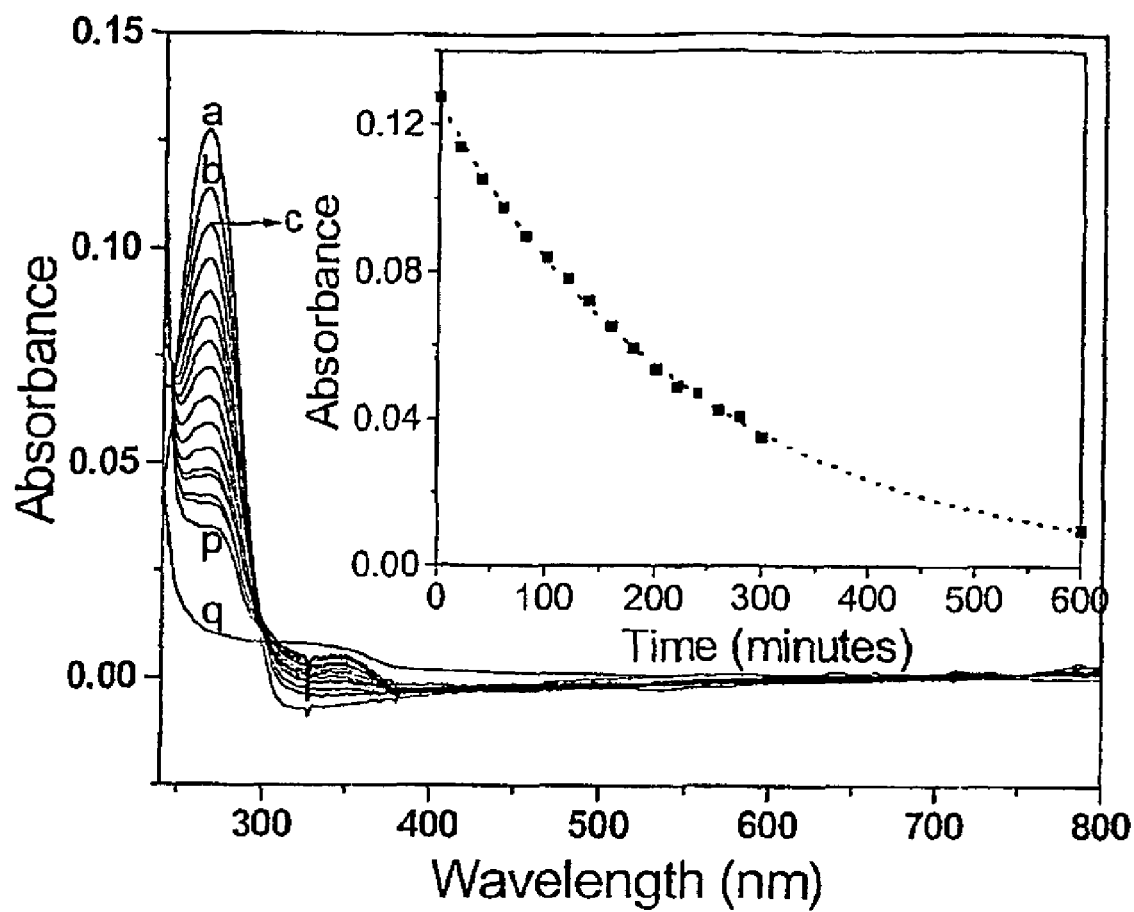
FIG. 3 shows graphical representation of removal of 1 ppm malathion from water using silver nanoparticles supported on alumina.

FIG. 3 refers to the time dependent UV-visible spectra showing the adsorption of 1 ppm malathion on $Al_2O_3$@ Ag. Trace a is the absorption spectrum of 1 ppm malathion having an absorption maximum at 267 nm and b is that of the solution taken 20 minutes after soaking the supported nanoparticles in the pesticide solution. The subsequent traces (c-p) were taken at 20 minutes intervals thereafter. Trace q was taken after 10 hours showing the complete disappearance of malathion from water. The inset shows the decrease in adsorbance vs. time for the reaction for the traces (a-q). The dotted line in the inset shows a fit of the exponential decrease in absorbance with time.

Figure 4:
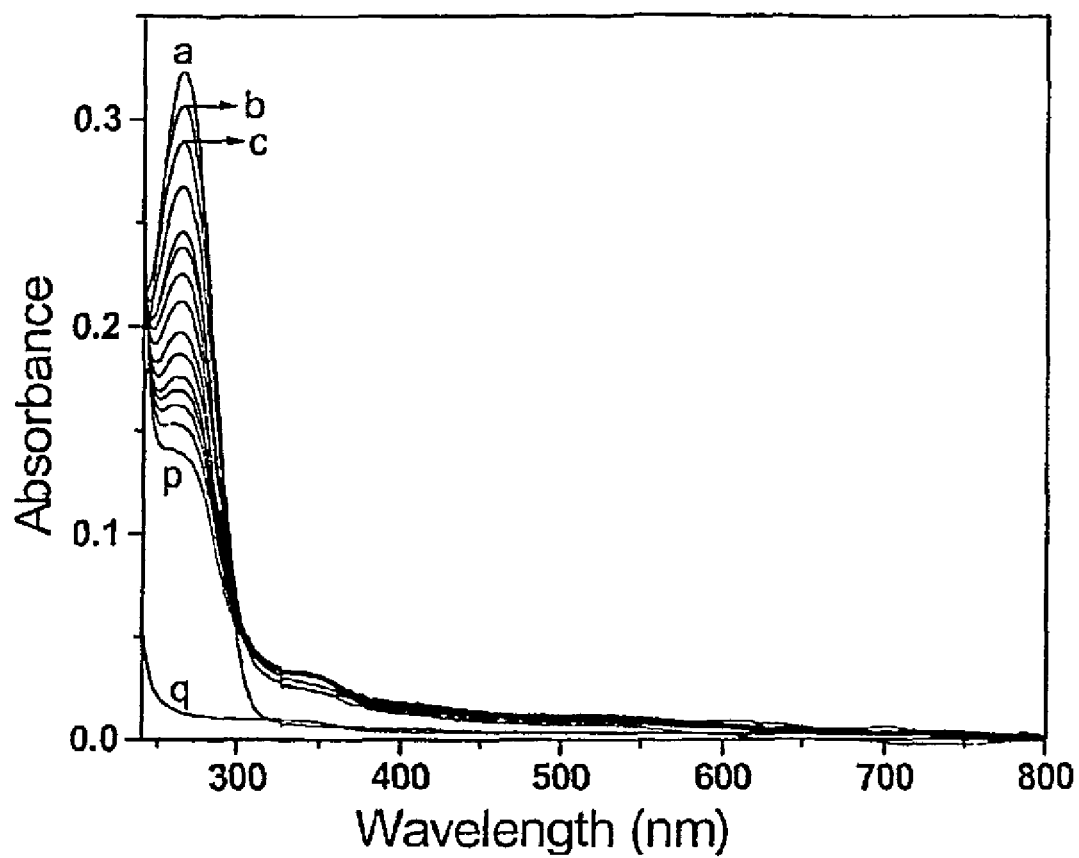
FIG. 4 shows graphical representation of removal of 1 ppm malathion from water using gold nanoparticles supported on alumina.

FIG. 4 refers to the time dependent UV-visible spectra of the reaction between 2.5 ppm malathion and $Al_2O_3$ @ Au. Trace a is the absorption spectrum of 2.5 ppm malathion. Trace b was taken 20 minutes after soaking the globules into the pesticide solution. Subsequent traces (c-p) were recorded at 20 minutes intervals. The gradual decrease in the absorbance of solution is due to the adsorption of malathion on the nanoparticles' surface. Trace q was taken after 10 hours showing the complete disappearance of malathion from water.

FIG. 5 shows the gas chromatogram of 1 L of the 50-ppb chlorpyrifos solution extracted thrice with 150 mL of hexane, evaporated to nearly 2 mL in rotavapor and made up to 10 mL using hexane. The peak at 2.933 min is that of chlorpyrifos (labeled CP) and that at 2.14 min is that of the solvent. FIG. 6 is the chromatogram of the chlorpyrifos solution (same concentration as above) after passing through the column loaded with $Al_2O_3$@Ag, extracted with hexane and made up to 10 mL as above. The absence of the peak at 2.993 min in FIG. 6 implies the complete removal of chlorpyrifos from water. The sensitivity of the detection for chlorpyrifos was estimated to be 1 ppb.

Figures 7, 8:
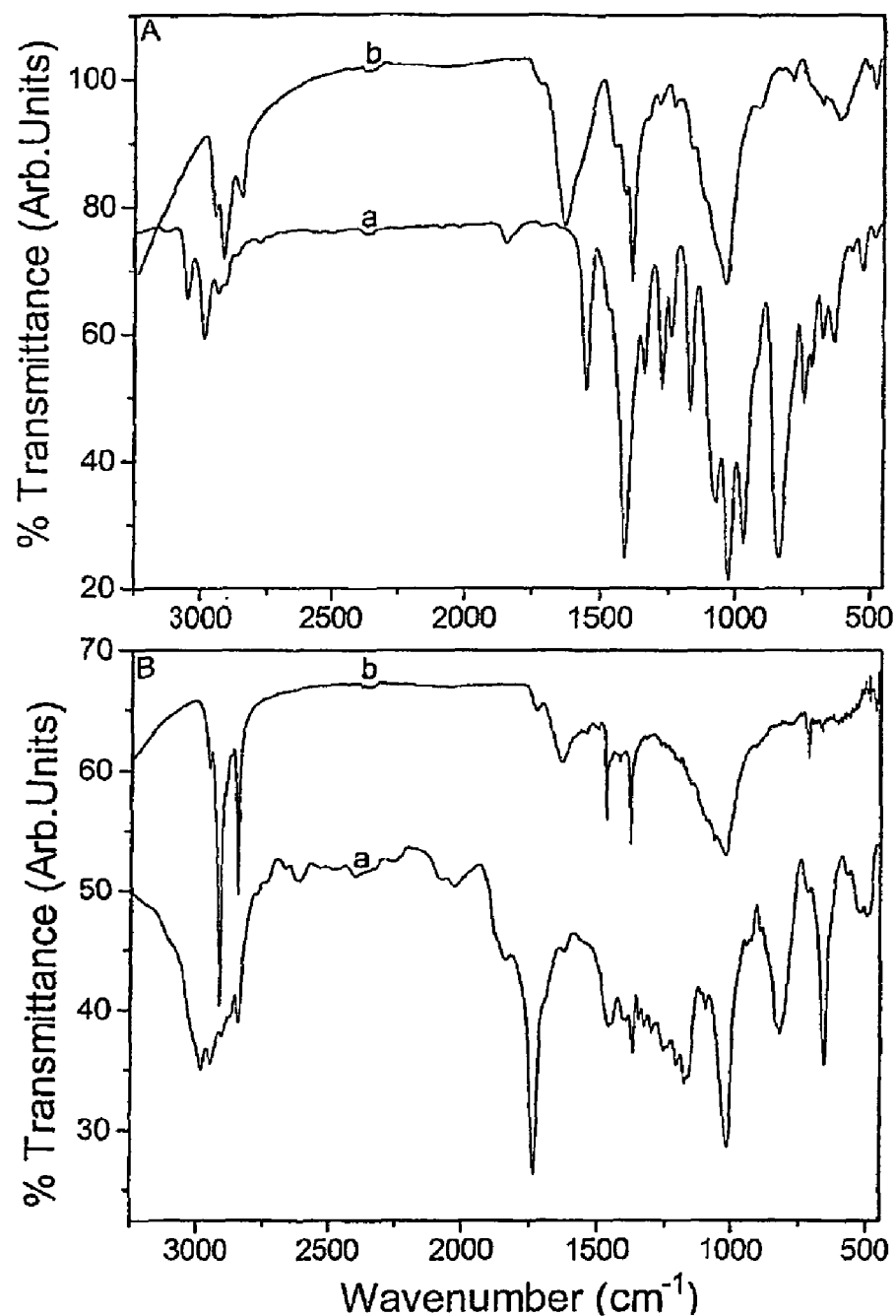
FIGS. 7 and 8 show graphical representations of infrared spectra indicating pesticide adsorption on nanoparticles' surface.

FIG. 7 refers to the IR spectra of pure pesticides and those adsorbed on the nanoparticles' surface. In FIG. 7, trace a is the IR spectrum of chlorpyrifos and b, is that adsorbed on Ag nanoparticles' surface. A careful comparison of the two spectra reveals that all IR features of chlorpyrifos are seen in trace b too, with reduced intensities accompanied by broadening and shifting due to changes in the symmetry as a result of binding on the nanoparticles' surface. Similarly FIG. 8 shows the IR spectra of pure malathion (a) and that adsorbed on the Ag nanoparticles' surface (b). The shift and broadening of the infrared features of the pesticide due to adsorption on the nanoparticles' surface are clearly visible from the traces. The additional peaks observed in the b traces of FIG. 7 and FIG. 8 are due to the citrate impurity.

The invention claimed is:

1. A method for the preparation of adsorbent compositions for removing pesticides like chlorpyrifos, malathion and other organo halogen/sulphur pesticides comprising metallic gold/silver nanoparticles having a size which is up to 150 nm deposited on activated alumina and/or magnesia, wherein said metallic gold/silver nanoparticles are prepared by:
    (a) diluting silver nitrate or $HAuCl_4\, 3H_2O$ in water to form a solution;
    (b) heating the solution from step (a);
    (c) adding a sodium citrate solution to the solution from step (b);
    (d) heating the solution from step (c) to produce a solution containing silver or gold nanoparticles;
    (e) soaking activated alumina and/or activated magnesia in the solution from step (d) to produce activated alumina and/or activated magnesia loaded with gold or silver nanoparticles; and
    (f) washing the loaded activated alumina and/or activated magnesia from step (e) with distilled water.

2. A method according to claim 1, wherein said activated alumina and/or magnesia are in globules and powder forms.

3. A method according to claim 1, wherein the loaded activated alumina and/or activated magnesia particles from step (f) are baked with activated carbon.

4. The method of claim 3, wherein the loaded activated alumina and/or activated magnesia particles from step (f) are baked with activated carbon at 120° C.

5. The method of claim 1, wherein in step (d) the heating continues until the solution turns to pale yellow for silver and wine red for gold.

6. The method of claim 1, wherein in step (b) the heating continues until boiling.

* * * * *